(12) United States Patent
Riel et al.

(10) Patent No.: US 7,619,754 B2
(45) Date of Patent: Nov. 17, 2009

(54) CURVED SENSOR ARRAY APPARATUS AND METHODS

(76) Inventors: Ryan D. Riel, 1373 Caledonia Cir., Louisville, CO (US) 80027; Adam E. Calihman, 1717 Spruce St., #4, Boulder, CO (US) 80302; David S. Thomson, 365 S. 45th St., Boulder, CO (US) 80305

( * ) Notice: Subject to any disclaimer, the term of this patent is extended or adjusted under 35 U.S.C. 154(b) by 0 days.

(21) Appl. No.: 12/148,682

(22) Filed: Apr. 21, 2008

(65) Prior Publication Data

US 2008/0316462 A1 Dec. 25, 2008

Related U.S. Application Data

(60) Provisional application No. 60/925,512, filed on Apr. 20, 2007, provisional application No. 61/067,420, filed on Feb. 28, 2008.

(51) Int. Cl.
*G01B 11/14* (2006.01)

(52) U.S. Cl. .................... 356/625; 356/51; 250/226

(58) Field of Classification Search .................... 356/51, 356/614–625, 416, 418, 419; 250/226, 338.5, 250/339.01, 339.02, 339.07; 342/432, 359, 342/368
See application file for complete search history.

(56) References Cited

U.S. PATENT DOCUMENTS

| 4,467,361 | A | * | 8/1984 | Ohno et al. ................. 348/340 |
| 4,687,923 | A | | 8/1987 | Bauck |
| 4,979,221 | A | | 12/1990 | Perryman et al. |
| 5,276,496 | A | | 1/1994 | Heller et al. |
| 5,416,591 | A | * | 5/1995 | Yoshimura et al. .......... 356/608 |
| 5,581,241 | A | * | 12/1996 | Kaufman et al. ............ 340/630 |
| 6,292,134 | B1 | | 9/2001 | Bondyopadhyay |
| 6,841,784 | B2 | | 1/2005 | Brahme et al. |
| 7,277,053 | B2 | | 10/2007 | Riel et al. |

(Continued)

FOREIGN PATENT DOCUMENTS

FR 2625396 12/1987

(Continued)

OTHER PUBLICATIONS

Morhac et al., Identification of peaks in multidimensional coincidence gamma-ray spectra, Nuclear Instruments and Methods in Research, 2000, pp. 108-125, A443.

*Primary Examiner*—Sang Nguyen
(74) *Attorney, Agent, or Firm*—Jennifer L Bales; Macheledt Bales & Heidmiller LLP (57) ABSTRACT

Curved sensor array configurations and methods of processing the data gathered by the sensors. A 2 dimensional embodiment comprises singular ring of sensors that can monitor sources in a 2 dimensional plane. A sensor directly facing a target produces a maximum response. As the angle of a sensor relative to the target increases, the response decreases. Fitting the sensor response amplitudes to a 2D Gaussian curve and calculating the peak of the curve allows a very accurate calculation of the angular direction of the target. A 3D embodiment comprises sensors distributed over the surface of a sphere in order to monitor multiple targets in any spatial orientation. Again, the sensor amplitude data is fitted to a 3D curve or surface such as a Gaussian surface. The present invention can resolve more than one target using deconvoluting techniques.

21 Claims, 12 Drawing Sheets

U.S. PATENT DOCUMENTS

| | | |
|---|---|---|
| 7,315,377 B2 * | 1/2008 | Holland et al. .............. 356/419 |
| 7,351,588 B2 | 4/2008 | Poponin |
| 2003/0076304 A1 * | 4/2003 | Smyth ....................... 345/167 |
| 2007/0034732 A1 | 2/2007 | Sallee |
| 2008/0151084 A1 | 6/2008 | Lu et al. |

FOREIGN PATENT DOCUMENTS

| | | |
|---|---|---|
| GB | 2330263 | 4/1999 |
| WO | WO/2008/027023 | 3/2008 |

\* cited by examiner

CURVED SENSOR ARRAY APPARATUS AND METHODS

This application claims the benefit of Provisional Application for Patent Ser. No. 60/925,512, filed Apr. 20, 2007 and Provisional Application for Patent Ser. No. 61/067,420, filed Feb. 28, 2008.

U.S. Pat. No. 7,277,053 is incorporated herein by reference.

BACKGROUND OF THE INVENTION

1. Field of the Invention

The present invention relates to curved sensor array apparatus and methods. In particular, the present invention relates to configurations of curved sensor arrays and methods of processing data gathered from the sensors.

2. Description of the Related Art

U.S. Pat. No. 7,277,053 (to a subset of the present inventors and incorporated herein by reference) teaches apparatus and methods for detecting and locating signals. That invention utilized sensors arrayed on a sphere or the like to determine the direction of a sensed signal.

While the apparatus and methods of U.S. Pat. No. 7,277,053 work well in detecting targets widely spread in space, improved sensor array configurations and signal processing of the detected signals gives even better results.

The present invention is particularly useful in infrared search and track (IRST) sensing systems. IRST systems classically employ distributed passive electro-optical systems to achieve a large field of regard (FOR) providing improved situational awareness. They are mainly used for detection, classification and identification of targets within a line-of-sight. Their advantages over similar active technologies, such as radar, include low power consumption, high-speed scanning, high angular accuracy, high immunity to countermeasures, accurate target discrimination, and passive operation.

Since the sixties IRST systems have been used on military jet fighters and since the seventies on naval ships for offensive and defensive use. Advances in sensing have expanded the application of IRST technologies to a host of platforms for both defense and security operations. Platforms include marine vessels, aircraft, ground vehicles, man-portable units, and stationary mounts. IRST systems are now used to detect a multitude of targets each with their distinct infrared signatures. Target types include small arms fire, missiles, RPG's, vehicles, and people. Optical ranges and IR band selection depend on the platform and application.

The demands of modern infrared search and track (IRST) sensor systems include:

Wide Field of Regard
Long range standoff detection
High speed detection and tracking
Simultaneous tracking of multiple threats in multiple IR Bands
Passive sensing
Target Verification A need remains in the art for improved curved sensor array configurations and for methods of processing the data gathered by the sensors.

SUMMARY

An object of the present invention is to provide improved curved sensor array configurations and for methods of processing the data gathered by the sensors. A first embodiment comprises singular ring of sensors that can monitor sources in a 2 dimensional plane. A sensor directly facing a target produces a maximum response. As the angle of a sensor relative to the target increases, the response decreases. Fitting the sensor response amplitudes to a 2 dimensional curve such as a 2D Gaussian or Cosine curve and calculating the peak of the curve allows a very accurate calculation of the angular direction of the target.

A second embodiment comprises sensors distributed over the surface of a sphere in order to monitoring multiple targets in any spatial orientation. Full spherical systems offer a 4 Pi steradian Field of Regard (FOR) for complete situational awareness. Again, the sensor amplitude data is fitted with a surface such as a Gaussian surface, but in three dimensions.

For a given curved sensor array, data processing maps the signal strength detected at each sensor and maps it to a surface (such as a Gaussian or Cosine surface), adapted for the angular orientation of the sensors forming the array. From the fitted surface, more accurate directional data may be determined. In addition, angular dimensions may be computed for IR systems, temperature of targets discerned. In systems with accurate range finding capabilities, actual target sizes may be computed.

The present invention can resolve more than one target simultaneously. A two dimensional system utilizes a circular band of sensors. Three dimensional systems have sensors distributed over a sphere (or other curved surfaces) in a variety of configurations. Spherical Sensor Configurations (SSCs) are particularly useful, as they provide up to a 4 pi steradian Field of Regard (FOR).

A method according to the present invention for locating a target comprises the steps of providing a convex curved sensor array region for detecting the target, positioning the sensor array such that a portion of the sensors in the sensor array can detect the target signal, detecting the target signal with a portion of the sensors in the sensor array, gathering data from the sensor array based upon the signal response detected by each sensor, fitting the gathered data to a curved shape, finding the maximum of the curved shape, and determining target direction based upon the maximum and the position of the sensors.

The sensor array may be positioned so that a portion of the sensors detect more than one target signal. In this case, peaks are found in the gathered data representing targets, each peak is fitted to a curved shape, the maximums of each curved shape are found, and the direction of each target is determined based upon the maximums and the position of the sensors.

When the sensor array detects more than one target, deconvolving the gathered data to separate the peaks is sometimes useful. One method of deconvolving comprises the step of reducing the field of view of the sensors to separate peaks. Another method of deconvolving comprises the step of applying baseline subtraction to the gathered data.

As a feature, the invention may measure the width of the curved shape, or determine the cross section of the curved shape, to provide more information about the target profile.

The present invention may further include the method of providing output data based upon the gathered data and the determined target direction to a control system, a user display, a PTZ camera system, or a countermeasures system. It may also generate output data representing the trajectory of targets.

The convex curved sensor array region may take a number of forms, including a sphere with a ring of sensors arrayed about its circumference, a sphere with sensors distributed over its surface, a dome, a cone, an ellipsoid, a polygon approximating a convex curve, or a multi-sided face approximating a convex curve.

In the case of a sphere with sensors distributed over its surface the step of calculating the position of the sensors may be accomplished using a triangular packing algorithm.

The curved shape might approximates a 2 dimensional Gaussian curve, a 3 dimensional Gaussian surface, a 2 dimensional cosine curve, or a 3 dimensional cosine surface;

The method of the present invention may also include the step of calculating an estimated distance to the target from the signal strength. As a feature, it might apply filters to the sensors to detect different wavelengths from targets. For example, multi-element detectors with different filters for spectral analysis.

Another embodiment includes the step of fitting the data to mostly saturated sensors with reversed Gaussian or cosine functions.

The sensor might detect a number of kinds of signals such as infrared, sound, RF, or ultraviolet.

BRIEF DESCRIPTION OF THE DRAWINGS

FIG. 9 is an isometric drawing showing a multi-ringed distribution of sensors. This embodiment uses fewer sensors and views a smaller FOR.

DETAILED DESCRIPTION OF THE PREFERRED EMBODIMENTS

Figure 1A:
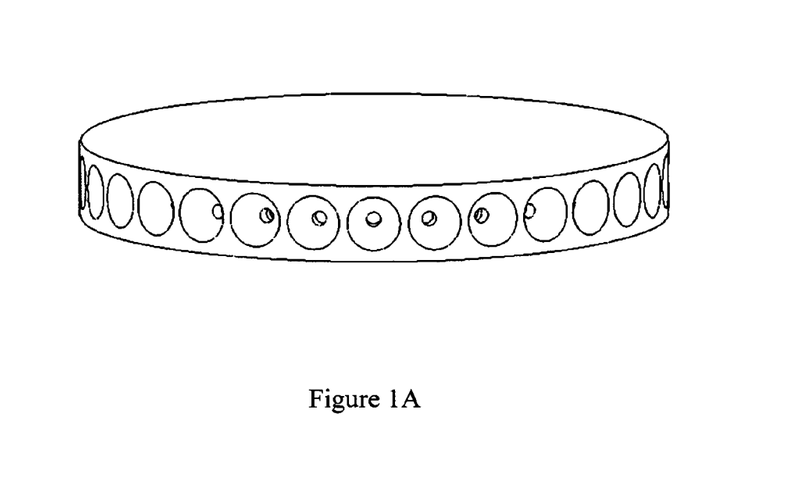
FIG. 1A is a schematic drawing illustrating a first, 2 dimensional, embodiment of the present invention.

The following acronyms are used herein:
FOR—Field of regard (for the sensor array)
FOV—Field of view (for an individual sensor)
FPA—focal plane array
IRST—Infrared search and track
PTZ—Pan, tilt, zoom
SDS—Spherical detection systems
SSC—Spherical sensor configurations FIG. 1A is a schematic drawing illustrating a first, 2 dimensional, embodiment of the present invention. The invention provides a robust method for locating sources in 2D. The 2D prototype was designed with 30 IR sensors mounted on a 4 inch diameter ring. The sensors have a 100° FOV and are each separated angularly by 12 degrees. The sensors receive light in the 350-1150 nanometer spectral range. The sampling rate is variable up to 100 kHz and is generally set to 10 Hz for display purposes.

Figure 1B:
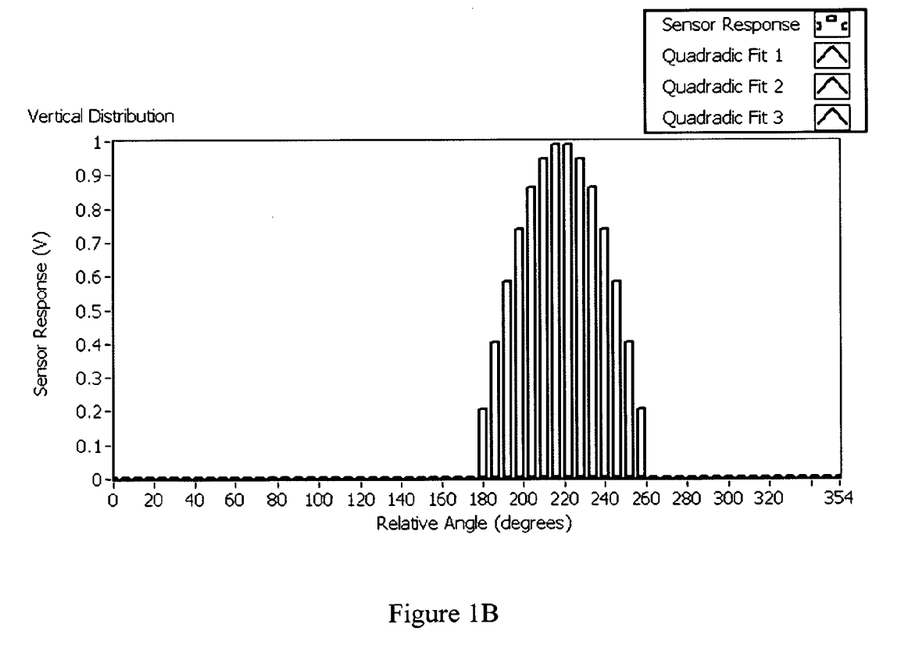
FIG. 1B is a plot of the signal amplitude from the embodiment of FIG. 1A fitted to a Gaussian curve.
Figure 1C:
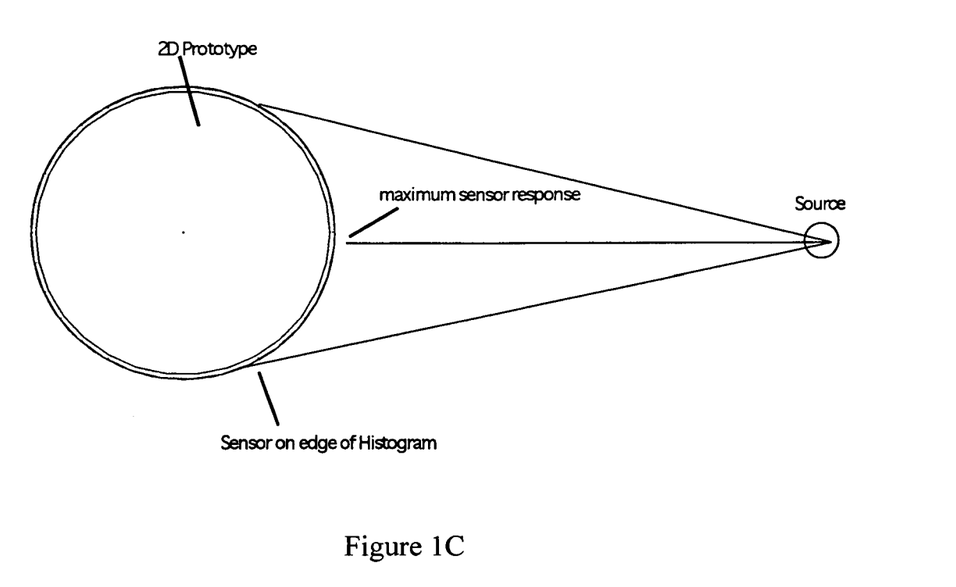
FIG. 1C is a schematic plan view of the embodiment of FIG. 1A, showing the sensors illuminated by a target.

Sensors directly facing an IR source produce a maximum response from the source relative to the other sensors on the ring, as shown in FIG. 1C. As the angle of the sensor relative to the source increases, the response from the sensor decreases. The sensor results can be plotted in a histogram fashion with the x-axis representing the angle of the sensor on the ring and the y-axis representing sensor response in Volts. The histogram generally takes on the shape of a Gaussian function. The center of the peak represents the strongest sensor response and therefore the direction of the source.

The sensor data is thus fitted to a Gaussian curve most closely matched to the data set. FIG. 1B is a plot of the signal amplitude from the embodiment of FIG. 1A fitted to a Gaussian curve. The maximum peak is calculated and the corresponding x-value is obtained to determine the direction of the source. Using this mathematical technique, incoming sensor data is analyzed to determine the direction of the source with better than 0.05 degrees (0.87 mrad) of accuracy. Current advancements in circuit design and peak fitting algorithms can significantly increase the accuracy.

In addition to determining the maximum of the peak, the peak width can be measured to determine the angular width of a source. The peak width is directly proportional to the angle subtended by a source. The current prototype uses a sensor with a very wide FOV, which allows for about 3 independent sources to be tracked. By increasing the density of sensors and decreasing the field of view of the sensor, more sources can be tracked simultaneously.

A second prototype uses a Fresnel lens with a 30° FOV allowing for the tracking of more independent sources. It uses a thermopile sensor for detecting human IR in the 8-12 μm thermal imaging band. Using a combination of a thin Fresnel lens and the thermopile detector, field tests have obtained ranges of 100+ feet for a human target under average conditions (23 C). The data acquisition and control system is based off a PC-104 system running XP embedded with two 16 channel data acquisition cards for the analog input. The control program operates at 10 Hz with a similar display to the VIS-NIR prototype. The unit provides a robust method for locating thermal targets in a horizontal plane for ground or marine based applications.

2D Human IR Prototype System Specifications:
30 sensors with 30 degree FOV on a 16 inch diameter ring Sensor Optic combo: 1.3 inch Fresnel lens and Thermopile detector PC-104 computer-MSM800 geode LX 800 500 Mhz Computer power (1600 mA @5V)

Control System: XPembedded OS, Labview 8.5 DAQ and algorithm processing

Data Acquisition: Diamond Systems 16 AT (350 mA @5V×2)

Sensor/amplifier power (1.1 mA×30@5V)

Data output: Ethernet, wireless Ethernet, RS-422/232.

Options: Increased sensor density, long range optics, wide vertical FOV

The 2D Human IR System can be utilized on a ground based vehicle, tripod or as a pole mounted system for detecting and tracking human IR targets. Networked systems can be integrated for wide area surveillance.

Figure 2A:
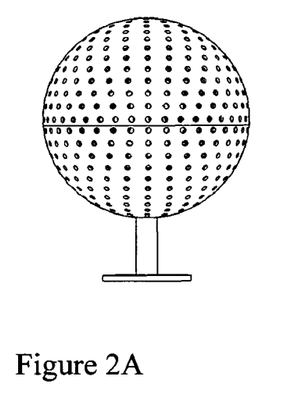
FIG. 2A is a side view of a second, 3 dimensional embodiment of the present invention.
Figure 2B:
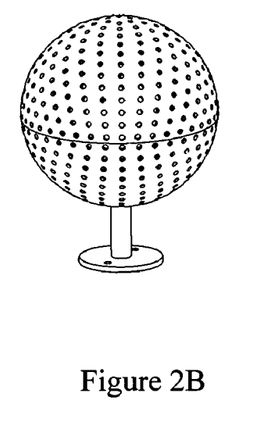
FIG. 2B is an isometric view of the embodiment of FIG. 2A.
Figure 2C:
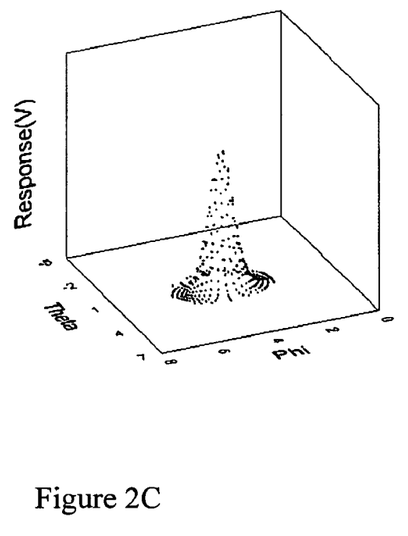
FIG. 2C is an isometric view of the data from the embodiment of FIG. 2A fitted to a 3 dimensional Gaussian curve.
Figure 2D:
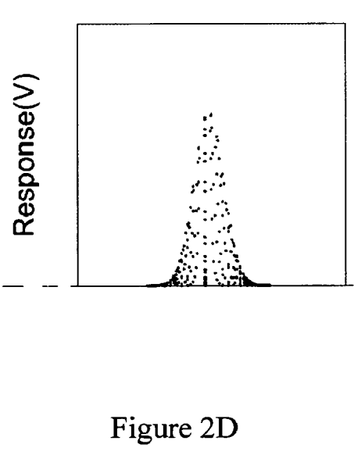
FIG. 2D is a side view of the curve of FIG. 2C.

FIG. 2A is a side view of a second, 3 dimensional embodiment of the present invention. FIG. 2B is an isometric view of the embodiment of FIG. 2A. FIG. 2C is an isometric view of the data from the embodiment of FIG. 2A fitted to a 3 dimensional Gaussian surface. FIG. 2D is a side view of the curve of FIG. 2C.

Various Spherical Sensor Configurations can be designed to gain information about the relative 3D position of signal sources. These configurations include a 3-ringed system (see FIG. 11), a parallel multi-ringed system (see FIG. 9), full spherical distribution (see FIGS. 8A-8C) and a multitude of other combinations depending on the application. For a complete 4 pi steradian FOR with multi-target tracking abilities a full spherical sensor distribution is implemented, such as the embodiment of FIG. 2A. The full distribution of sensors can track multiple targets simultaneously in nearly any spatial orientation. This system excels where conventional imaging systems fail, particularly in multi-target scenarios where targets are widely spread in space.

Given the location of the sources, the sensors on the sphere respond to IR heat signatures in a Gaussian fashion. As described below, the software provides means to display the original combined data from the sensors, or to separate out and display each source individually. The sensor FOV and number of sensors can be altered allowing the user to select an optimal SSC configuration for the number of sources that need to be tracked. In addition the software allows the user to set the sources on independent trajectories. The trajectories/feature details how the SDS handles multiple targets crossing paths and is able to uniquely identify each target.

Figure 3A:
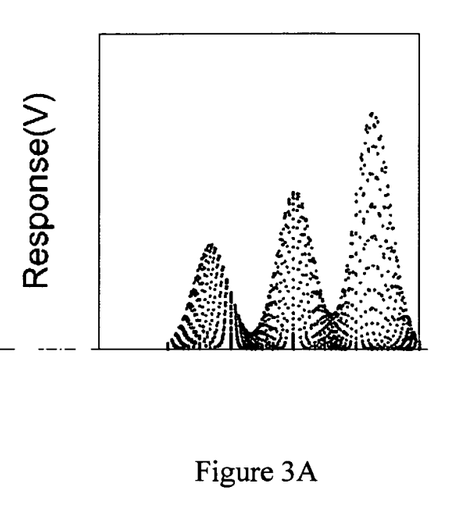
FIG. 3A is a plot of the signal amplitude from three fairly well separated targets.
Figure 3B:
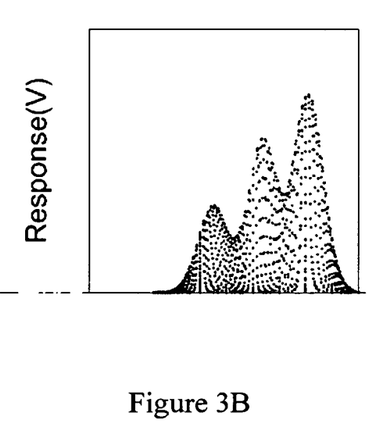
FIG. 3B is a plot of the signal amplitude from the embodiment of FIG. 2A in the presence of three close together targets.
Figure 3C:
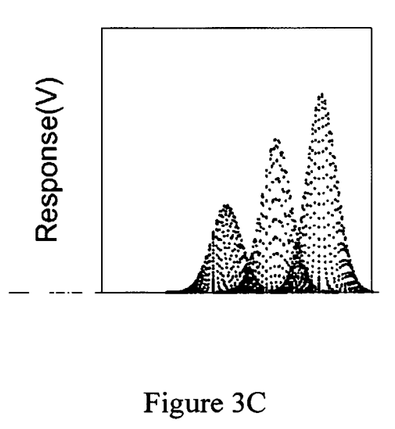
FIG. 3C is a plot showing the data of FIG. 3B after a peak deconvolution technique is applied.

FIG. 3A is a plot showing the signal amplitude from three fairly well separated targets. FIG. 3B is a plot of the signal amplitude from three close together targets. FIG. 3C is a plot showing the data of FIG. 3B might look after a peak deconvolution technique is applied.

A wide range of algorithms can be applied to analyze the incoming sensor data. Using peak deconvolution techniques, overlapping peaks can be analyzed for closely spaced sources, such as those in FIG. 3B. These algorithms include baseline subtraction, smoothing, peak searching, and finding peak maximums. Miroslav Morháč of the Institute of Physics, Slovak Academy of Sciences, Bratislava, Slovakia has developed an extensive software package for analyzing 1 D and 2D spectral data. The software package was originally designed for processing gamma ray spectral data, but can be applied universally to any 2D spectral data. The present invention applies it to the spherical distribution.

Figure 4A:
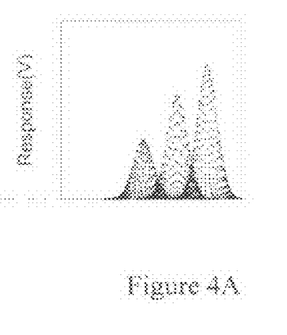
FIG. 4A is a plot of the signal amplitude from three targets with maximum field of view (FOV).
Figure 4B:
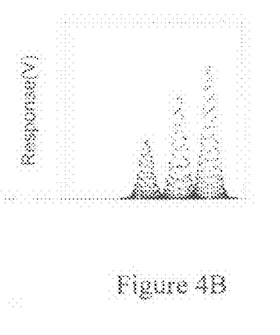
FIG. 4B shows the data that results from reducing the FOV by a third.
Figure 4C:
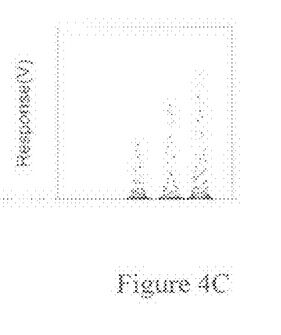
FIG. 4C shows the data that results from reducing the FOV by two thirds.

FIG. 4A is a plot of the signal amplitude from three targets with maximum sensor field of view (FOV). FIG. 4B shows the data that results from reducing the FOV by a third. FIG. 4C shows the data that results from reducing the FOV by two thirds.

These diagrams show varying sensor response to the same three targets. Assuming all sources are equal, the left source is the furthest from the sphere while the right is the closest and center is in between. FIG. 4B shows the effect of decreasing the sensor FOV (for example from a 30 FOV to a 20 FOV) in order to separate out peaks. This results in fewer active sensors per target, allowing more sources to be tracked without having to perform extensive peak deconvolution. FIG. 4C shows the effect of decreasing the sensor FOV even further (for example to 10 FOV). Note that the peaks are separated without the need for complicated signal processing.

TABLE 1

The number of sensors on the sphere relative to the sensor FOV. The table also shows the number of discrete targets that can be discerned and the number of active sensors per target.

| # of sensors in array | Sensor FOV, ° | # of discrete targets | Active sensors per target |
|---|---|---|---|
| 160 | 10 | 33 | 4 |
| 160 | 20 | 10 | 13 |
| 160 | 30 | 6 | 29 |
| 500 | 10 | 33 | 15 |
| 500 | 20 | 10 | 50 |
| 500 | 30 | 7 | 75 |
| 1000 | 10 | 33 | 30 |
| 1000 | 20 | 10 | 100 |
| 1000 | 30 | 7 | 150 |

Figure 5A:
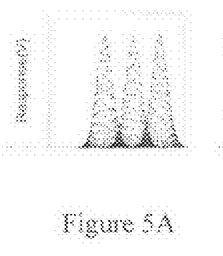
FIG. 5A is a plot of the signal amplitude from two targets.
Figure 5B:
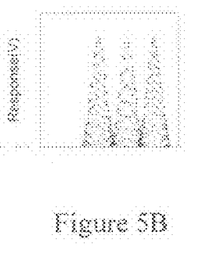
FIG. 5B is a plot of the data from FIG. 5A after a small amount of baseline subtraction.
Figure 5C:
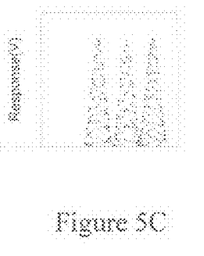
FIG. 5C is a plot of the data from FIG. 5A after a medium amount of baseline subtraction.
Figure 5D:
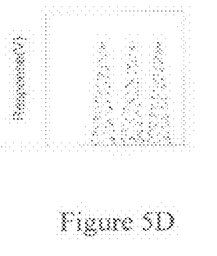
FIG. 5D is a plot of the data from FIG. 5A after a large amount of baseline subtraction.
Figure 5E:
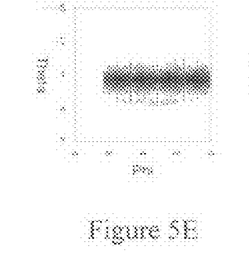
FIGS. 5E-H show cross section of the plots of FIGS. 5A-D respectively.
Figure 5F:
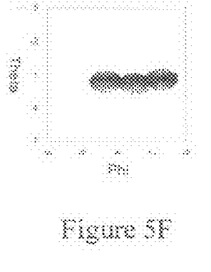
Figure 5G:
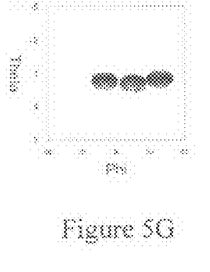
Figure 5H:
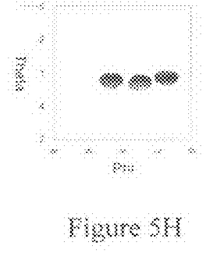

FIG. 5A is a plot of the signal amplitude from two targets. FIG. 5B is a plot of the data from FIG. 5A after a small amount of baseline subtraction. FIG. 5C is a plot of the data from FIG. 5A after a medium amount of baseline subtraction. FIG. 5D is a plot of the data from FIG. 5A after a large amount of baseline subtraction. These figures show a very basic technique in deconvoluting closely spaced peaks. This technique uses a baseline subtraction method to find individual peaks. This type of processing simplifies the algorithms and is well suited for working with onboard high-speed DSP processing.

FIGS. 5E-H show cross sections of the plots of FIGS. 5A-D respectively. These plots are cross sections of the Gaussian peaks, but note that the cross sections are not circular, but rather wider than they are tall. The cross sections of the peaks have taken on the shapes of the targets, giving an angular profile of the targets. Using the cross sections in comparison to known infrared heat signatures, the system can be used for target classification.

Figure 6A:
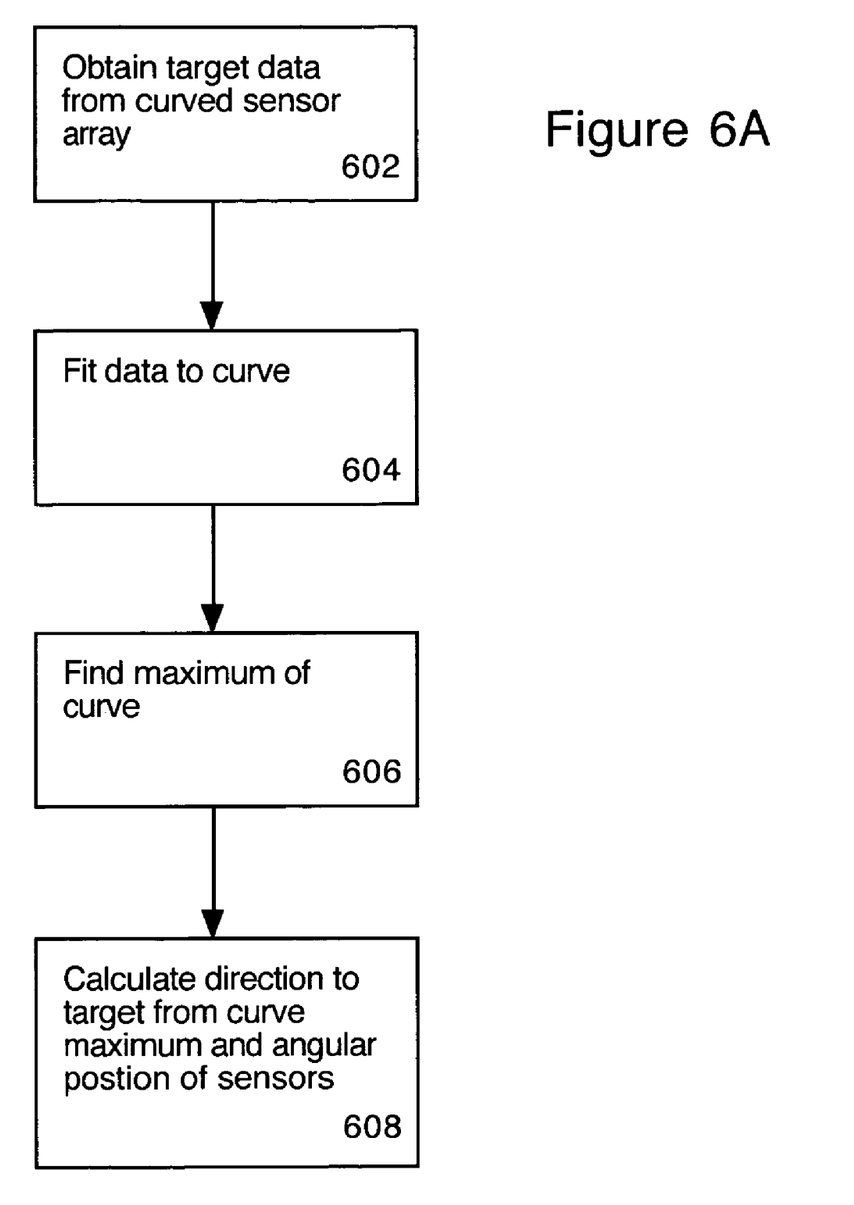
FIGS. 6A-6C are flow diagrams illustrating the signal processing method of the present invention.
Figure 6B:
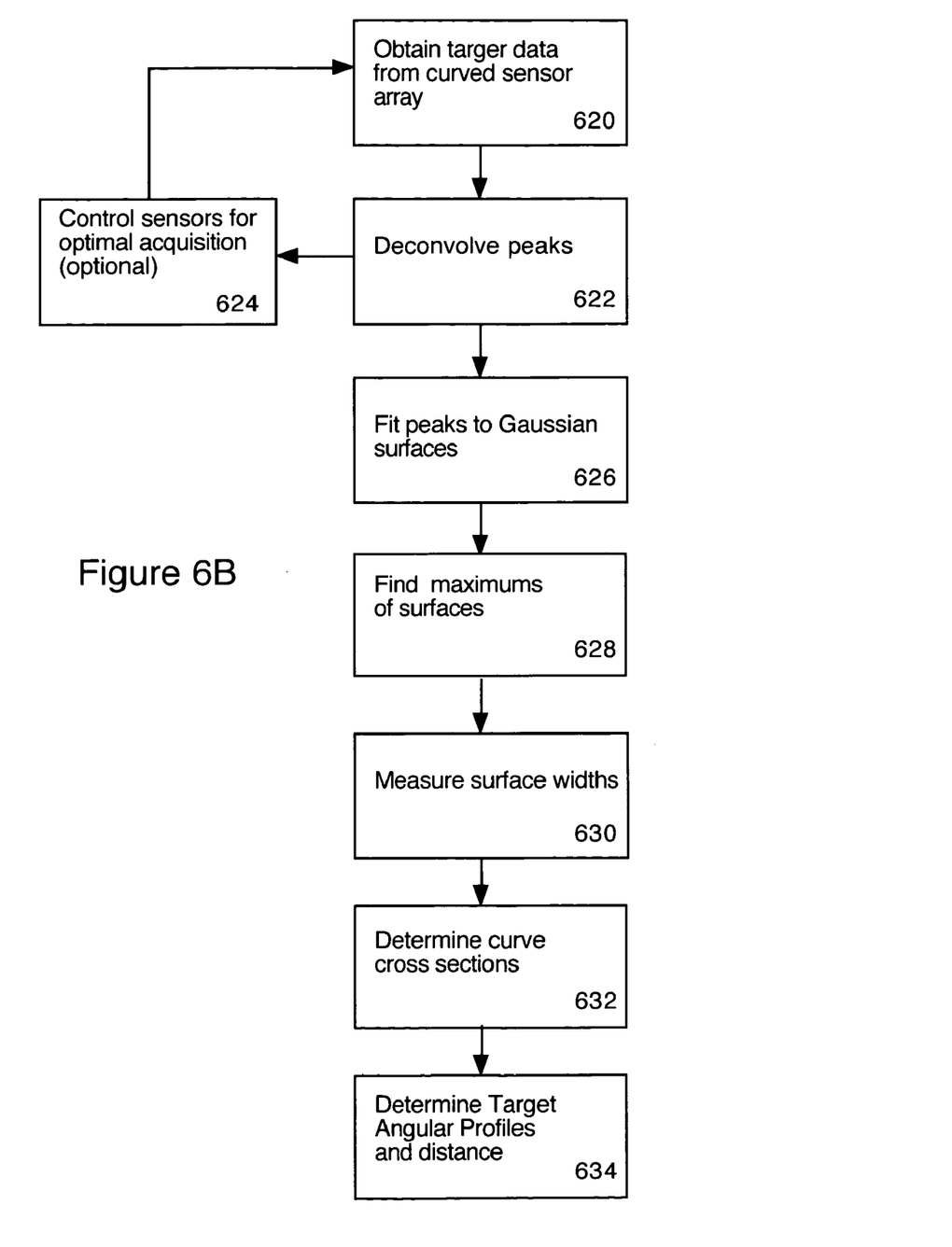
Figure 6C:
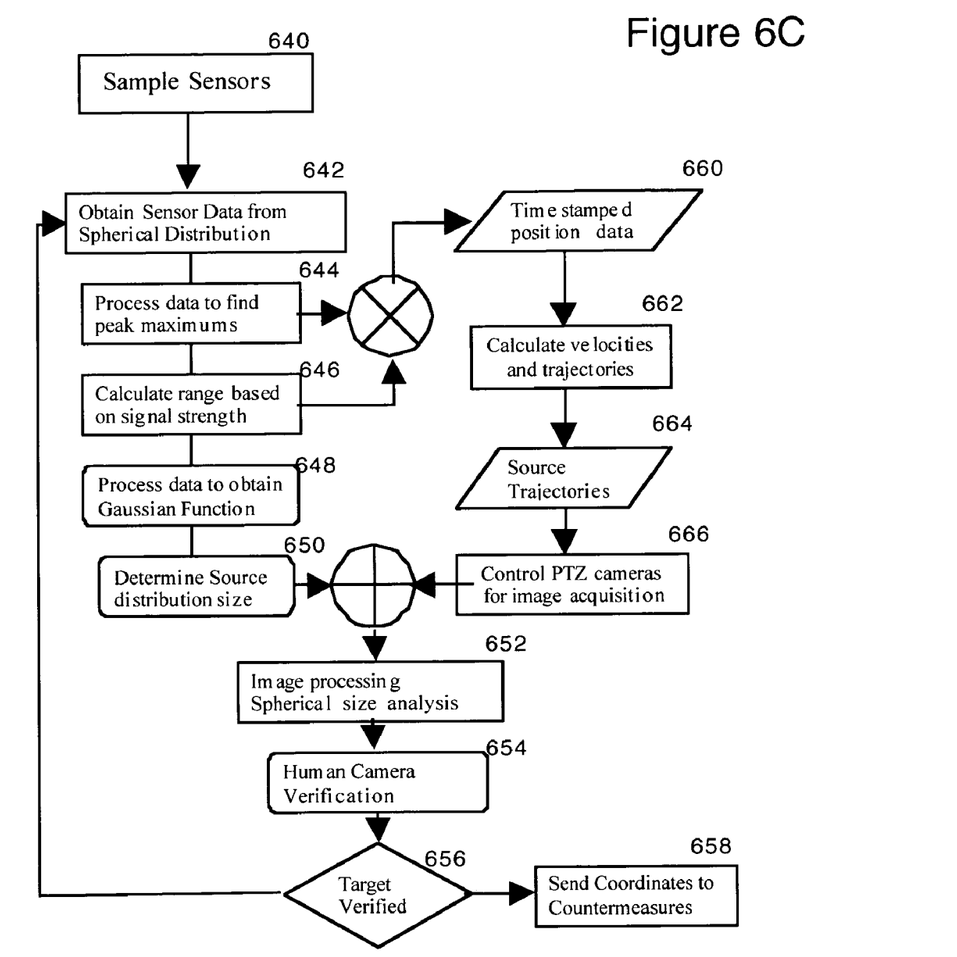

FIGS. 6A-6C are flow diagrams illustrating the signal processing methods of the present invention. FIG. 6A shows the simplest version, with detection of a single target, and finding only the direction of the target. In step 602, the process obtains data from the curved sensor array representing the response detected by each sensor. Step 604 fits the sensor data to a curved shape such as a Gaussian curve (for a 2 dimensional array) or a Gaussian surface (for a 3 dimensional array). Fitting the data to a cosine function also works fairly well, and is simpler computationally. Note that the term "curved shape" is used to indicate both 2 dimensional curves and 3 dimensional curved surfaces. It does not include linear or plane arrays, however.

Equation for Gaussian $$f(x, y) = Ae^{-\left(\frac{(x-x_0)^2}{2\sigma_x^2}\right) - \left(\frac{(y-y_0)^2}{2\sigma_y^2}\right)}$$

Step 606 finds the maximum of the curved surface. This maximum indicates the direction of the target much better than simply using the sensor with the maximum response. Step 608 computes the target direction from the curved surface maximum and the known angular position of the sensors.

FIG. 6B shows a more complicated version of the method of the present invention, where multiple targets are detected and target angular profiles are determined. In step 620, the process obtains data from the curved 3 dimensional sensor array, representing the response detected by each sensor. In step 622, the process deconvolves the peaks generated by the multiple targets if necessary. In this scenario it is often useful to modify sensor performance as shown in FIGS. 4A-4C. Step 624 performs that function as required so that more useful data is collected in step 620. Then each peak is fitted to a curved surface, such as a Gaussian shape, in step 626. The maximum of each Gaussian shape found in step 628 determines the direction of the target. The widths and/or cross sections of the Gaussian shapes are found in steps 630 and 632, and provide further information on the angular profile of the targets in step 34. FIGS. 5E-5H shows examples of this.

FIG. 6C illustrates a specific example of the method of the present invention where multiple targets are detected by a spherical sensor array and then tracked by a separate PTZ camera. Again, data for the spherical sensor array is obtained in step 640 and 642. In step 646, an estimated target range is calculated based on signal strength. In step 648, peaks are fitted to Gaussian functions. In step 650, target size is computed from computed distance and Gaussian width. Step 652 performs various image processing functions to analyze the size and shape of the targets, and step 654 allows a human user to visually verify the results. When a target is verified, step 656 sends the coordinates to a countermeasures process 658.

Meanwhile, step 660 time stamps position data for the targets, so that trajectories may be calculated in step 662. These trajectories are provided to the PTZ camera system in step 664, and the camera system tracks the targets in step 666.

Figure 7:
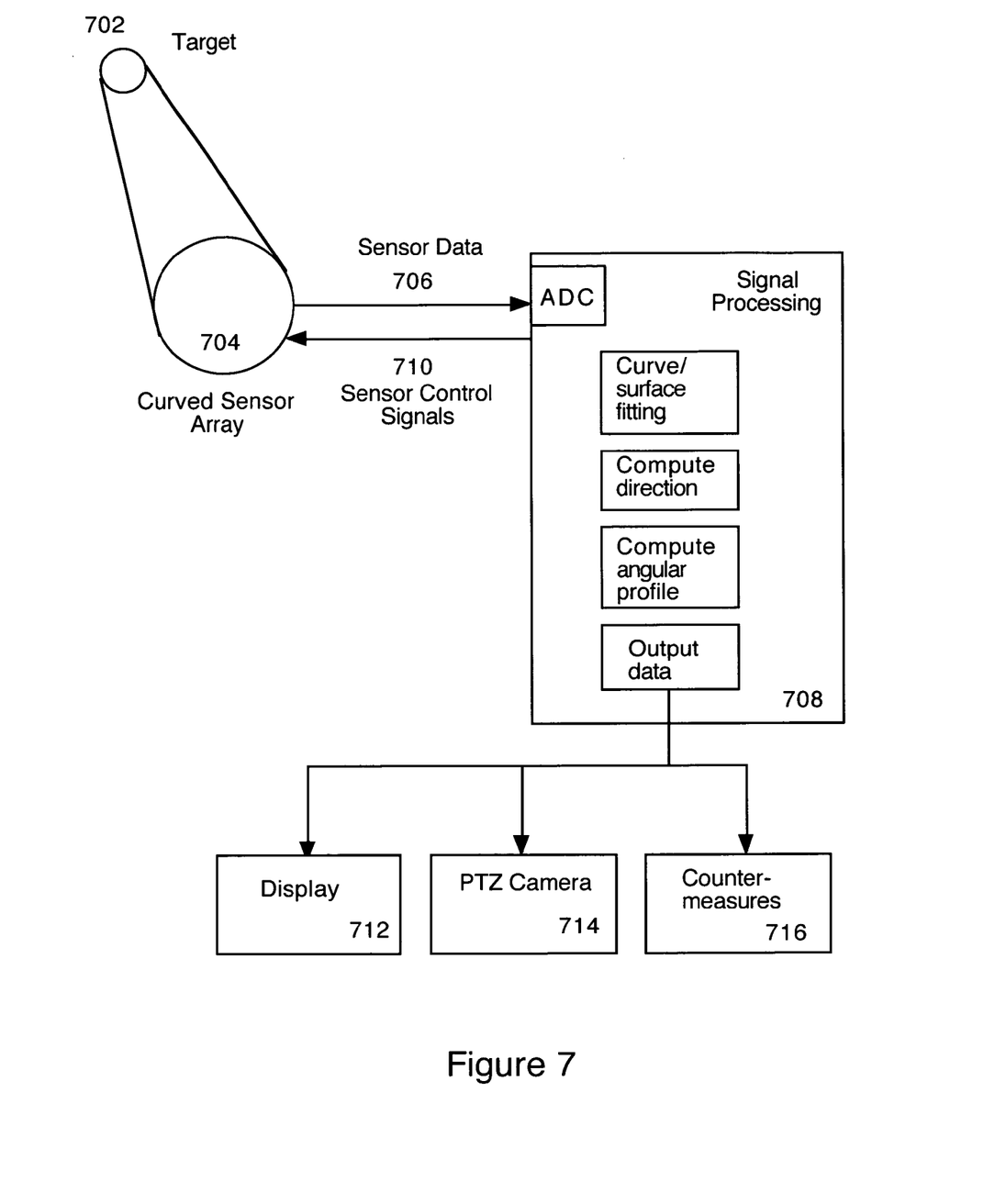
FIG. 7 is a block diagram illustrating the interaction of the elements of the embodiments of FIG. 1A and FIG. 2A.

FIG. 7 is a block diagram illustrating the interaction of the elements of the embodiments of FIG. 1A and FIG. 2A. Curved Sensor array 704 detects target 702. Sensor data 706 based on the response detected by each sensor is provided to the signal processor 708. Signal processor 708 processes the data as shown in FIG. 6. For example, processor 708 will probably include an analog to digital converter to convert voltages from the sensors to digital signals. The processor includes modules for shape fitting, finding target directions and angular profiles, and outputting data. Signal processor 708 may send control signals to sensor array 704, for example to lower the FOV of the sensors as shown in FIGS. 4A-4C. Generally, display data is provided to a user display 712 so that a user (not shown) can view plots similar to those shown in FIGS. 1B, 2C and 2D, and 3A-5H. Output data may also be provided to a PTZ camera system 714 and/or a countermeasures system 716.

Figure 8A:
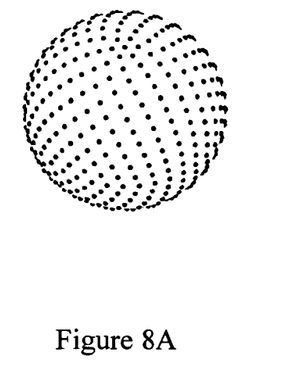
FIGS. 8A-8C are isometric drawings showing embodiments generated using the triangular lattice packing algorithms. The algorithms attempt to evenly distribute sensor on a sphere and produce spherically symmetric patterns. These patterns are useful in plotting data onto a theta phi plot for analysis.
Figure 8B:
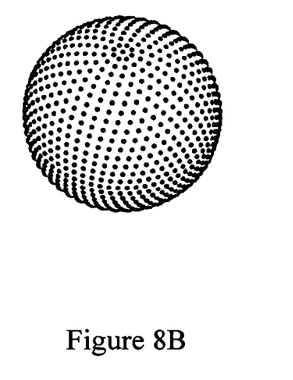
Figure 8C:
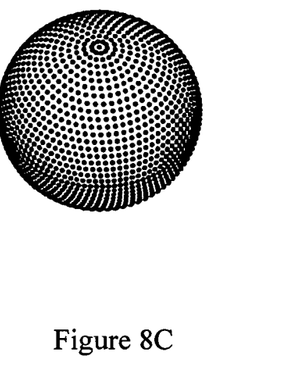

FIGS. 8A-8C show the use of spherical triangular packing algorithms for arranging sensors on a sphere for different numbers of sensors. The method uses a unique pattern to distribute sensors on a sphere. FIG. 8A shows N=503, FIG. 8B shows N=1150, and FIG. 8C shows N=2197. The increasing density allows for a smaller FOV.

Historically there is no solution for evenly distributing points on a sphere. An example of spherical models that attempt spherical distribution include Convex hull, Voronoi cells, Delaunay triangulation, Riesz s-energy, covering and packing with spherical caps, Norms of the Lagrange polynomials, Interpolatory cubature, cubature weights and determinants. All of these methods that have been thoroughly studied and fall short of evenly distributed points on a sphere for large values of n, where n is the number of points on the sphere. Lucid Dimensions has independently developed methods for distributing sensors on a sphere. This method uses a triangular lattice spacing that exhibits spherical symmetry when projected onto an XY plane. A symmetrical distribution greatly enhances the data processing capabilities provided smooth response to angular sources.

Figure 9:
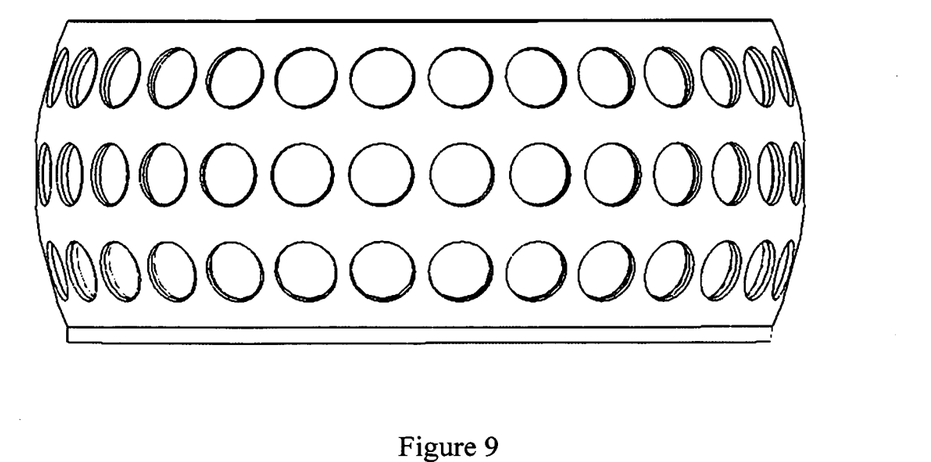

FIG. 9 is a design with multiple rings for monitoring a 360 horizontal FOR and a variable amount of vertical FOR. Generally the multiple ringed system will have a 360×120 degree FOV. This type of system is useful for monitoring sources on the horizon in 2D applications. Not only will the system give a horizontal angular direction but also a vertical angular direction within a specified FOR. This unit is used for applications that do not require a 4 Pi FOR.

Figure 10:
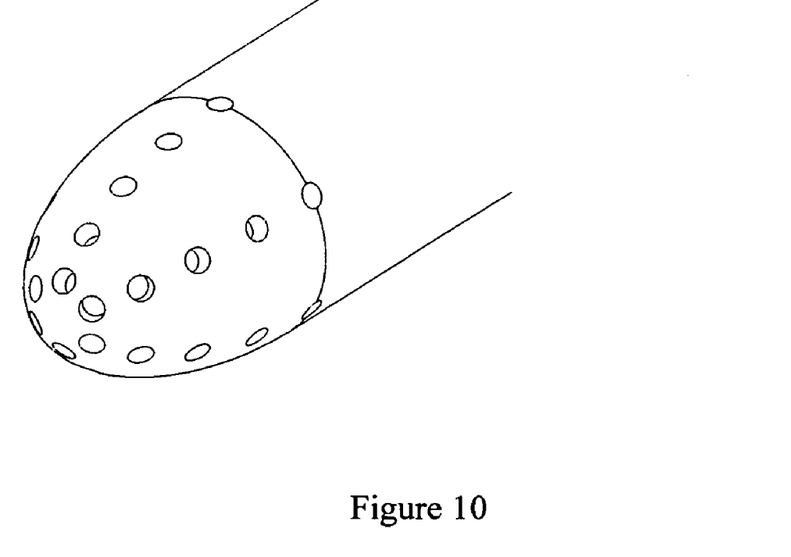
FIG. 10 is an isometric drawing showing a dome shaped distribution of sensors. This embodiment is useful for guiding a moving vehicle to a particular source.

FIG. 10 shows a dome or cone shaped configuration useful for guiding a projectile or vehicle to a particular source. This type of sensor distribution exemplifies the capabilities for conformal placement of sensors about an airplane or missile nose cone. In this case a smaller cone shaped FOR is monitored for a particular source. The angular coordinates are then projected onto a theta phi plane for use in analysis. Data collected from conformal sensor placement will produce angular coordinates to sources and is facilitated through this technology in variety of geometries to fit particular applications and platforms.

Figure 11:
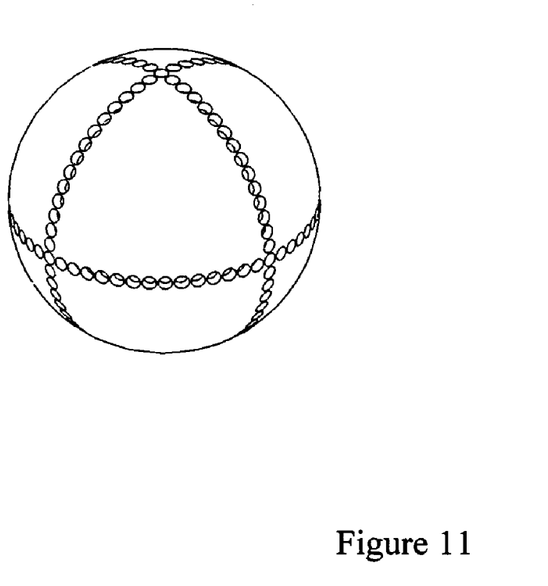
FIG. 11 is an isometric drawing showing 3-ringed distribution of sensors.

FIG. 11 is a design with three rings offering a device that works well for monitoring a single source in 3 dimensional space and providing angular information to that source. Using three bands of sensors decreases the amount of sensors required for tracking a target. The same mapping applies to the theta phi coordinate system and associated Gaussian or Cosine peak fit.

While a number of different sensor arrays are shown and described herein, those skilled in the art will appreciate that many other configurations will fall within the scope of the present invention. In all cases, at least a portion of the sensor array must be distinctly convex. In the ideal case, the sensors in a two dimensional configuration form a ring, so that the sensors face in directions up to 360° from each other. And in the ideal three dimensional case the sensors are scattered all over a sphere, so that the sensors face in directions up to 4 pi steradians from each other. However, the present invention also includes configurations where the sensors are arrayed such that they face in directions of about 180° from each other (as in FIG. 10) or even less. Even a configuration in which the sensors are arrayed such that they face in directions of about 60° from each other is still a substantial improvement over the present state of the art. Note also that while the term "convex curved region" is used herein, it includes configurations that approximate a curved region, such as polygons or a multi-sided faces.

Figure 12:
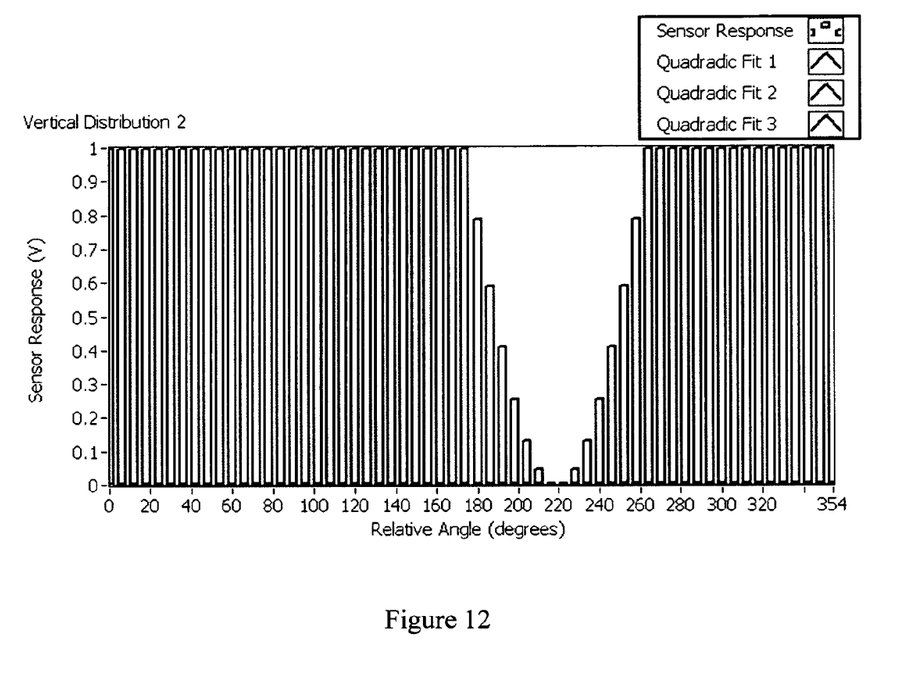
FIG. 12 is a plot showing reversed data and peak fit according to the present invention.

FIG. 12 shows a saturated sensor response to a hot background environment. Cold objects are also introduced creating a localized decrease in sensor response. This method is useful in hot environments looking for colder objects. Reversing the algorithms for saturated sensors will produce an inverted Gaussian curve or surface. This effect can be measured in a saturated light environment where a target may occlude the background emissions thus generating an "umbra", "shadow" or "eclipse" upon the detectors.

There exists a wide range of filters that can be used in combination with single or multi-element broadband IR detectors. These filters allow for both broad band filtering and narrowband filtering. By implementing particular filters and multi-element detectors the spherical sensor system can distinguish between different temperature objects. One common example is differentiating between a human IR signature and a ground vehicle IR signature. One of the detector elements can be fitted with a filter in the 3-5 um band while another element will have an 8-12 um filter. In this scenario the human IR signature will not produce a measurable response on the 3-5 um band, while the 8-12 band will produce a significant response. The vehicle temperature will generally saturate the 8-12 um sensor but will also be present in the 3-5 um band. This technique can be applied to various spectral bands depending on application. Sensors with 10 channels and greater offer detailed multi-spectral differentiation.

TABLE 2

Temperatures of a variety of sources and their associated peak wavelength

| Heat Source | K | ° C. | ° F. | Peak (um) |
|---|---|---|---|---|
| Nickel alloy flares, countermeasures | 1073 | 800 | 1472 | 2.7 |
| Piston engine airplane | 950/1255 | 677-982 | 1250-1800 | 3.05-2.31 |
| Jet engine airplane | 922-950 | 649-677 | 1200-1250 | 3.14-3.05 |
| Turbojet J79 airplane engine | 1223 | 950 | 1742 | 2.37 |
| Turbofan F100 airplane engine | 1573 | 1300 | 2372 | 1.842 |
| Jet afterburner | 2273 | 2000 | 3632 | 1.27 |
| AH-64 Apache engine parts | 423-863 | 150-590 | 302-1094 | 6.85-3.358 |

It will be appreciated by one skilled in the art that there are many possible variations on these designs that fall within the scope of the present invention. For example, other sensors beyond infrared include sound, ultraviolet, RF, etc. Other curved surface analysis, besides Gaussian, may be used in the curve fitting process, including the cosine function.

What is claimed is:

1. A method for locating a target comprising the steps of:
   (a) providing a convex three-dimensional curved sensor array region for detecting the target;
   (b) positioning the sensor array such that a portion of the sensors in the sensor array can detect the target signal;
   (c) detecting the target signal with a portion of the sensors in the sensor array;
   (d) gathering data from the sensor array based upon the signal response detected by each sensor;
   (e) fitting the gathered data to a curved shape;
   (f) finding the maximum of the curved shape; and
   (g) determining target direction based upon the maximum and the position of the sensors.

2. The method of claim 1 further including the steps of:
   positioning the sensor array so that a portion of the sensors detect more than one target signal;
   finding peaks in the gathered data representing targets;
   fitting each peak to a curved shape;
   finding the maximums of each curved shape; and
   determining the direction of each target based upon the maximums and the position of the sensors.

3. The method of claim 2 further including the step of deconvolving the gathered data to separate the peaks.

4. The method of claim 3 wherein the method of deconvolving comprises the step of reducing the field of view of the sensors to separate peaks.

5. The method of claim 3 wherein the method of deconvolving comprises the step of applying baseline subtraction to the gathered data.

6. The method of claim 1 further comprising the step of measuring the width of the curved shape.

7. The method of claim 6 further comprising the step of determining the cross section of the curved shape.

TABLE 3

A sampling of Dextor Research filter windows.

| Window/Filter Description | Filter ID | Band Pass Wavelength | Typical Peak Transmission | Typical Average Transmission | Thickness (inches) |
|---|---|---|---|---|---|
| Sapphire | U1 | 0.1-0.7 μm | 90% | 85% | .020-.049 |
| UV Quartz | U2 | 0.15-2.6 μm & 2.75-4.8 μm | 85% | 70% | .039 |
| B₃F₂ (Barium Fluoride) | U3 | 0.2-17.5 μm | 91% | 91% | .039 |
| KBr (Potassium Bromide) | U4 | 0.2-30 μm | 90% | 90% | ~.040 |
| ZnSe (Zinc Selenide) | U6 | 0.58-22 μm | 70% | 68% | .039 |
| KRS-5 | U5 | 0.58-50 μm | 71% | 68% | .039 |
| IRTRAN-2 (Zinc Sulfide) | W2 | 1.0-15 μm | 75% | 68% | .039 |
| A-R coated Si (Anti-Reflection) | W4 | 1.1-20 μm | 92% | 70% | .020 |
| Uncoated Si | U7 | 1.1-9.0 μm | 50% | 40% | .020 |
|  |  | 9.0-300 μm | 20% | 10% |  |
| C₃F₂ (Calcium Fluoride) | U8 | 1.5-12.5 μm | 91% | 91% | .020 (TO-18), .039 |
| Uncoated Ge | U9 | 1.8-30 μm | 45% | 45% | .039 |
| Diffractive Lens (DC-6132) 4.4 μm F. L. A-R coated | A1 | 2.0-14 μm | 90% | See data sheet | .0265 |

8. The method of claim 1 further comprising the step of generating output data based upon the gathered data and the determined target direction to at least one of the following devices:
- a control system
- a user display
- a PTZ camera system
- a countermeasures system.

9. The method of claim 8 further comprising the step of generating output data representing the trajectory of targets.

10. The method of claim 1 wherein the step of providing the convex curved sensor array region comprises providing a sphere with a ring of sensors arrayed about its circumference.

11. The method of claim 1 wherein the step of providing the curved sensor array comprises providing a sphere with sensors distributed over its surface.

12. The method of claim 11 wherein the step of providing a sphere with sensors distributed over its surface includes the step of calculating the position of the sensors using a triangular packing algorithm.

13. The method of claim 1 wherein the curved shape approximates one of the following:
- a 2 dimensional Gaussian curve;
- a 3 dimensional Gaussian surface;
- a 2 dimensional cosine curve;
- a 3 dimensional cosine surface.

14. The method of claim 1, further including the step of calculating an estimated distance to the target from the signal strength.

15. The method of claim 1, further including the step of applying filters to sensors to detect different wavelengths from targets.

16. The method of claim 1, further including the step of using multi-element detectors with different filters for spectral analysis.

17. The method of claim 1, further including the step of fitting the data to mostly saturated sensors with reversed Gaussian or cosine functions.

18. The method of claim 1, wherein the signals detected in step (c) comprise one of the following:
- infrared;
- sound;
- RF;
- ultraviolet.

19. Apparatus for locating a target comprising:
- a sensor array including sensors arrayed over a three-dimensional convex curved sensor region, the sensors capable of detecting signals from the target;
- means for positioning the sensor array such that a portion of the sensors detect the target signal;
- means for gathering data from the sensors based upon the signal response of each sensor;
- means for fitting the gathered data to a curved shape;
- means for finding the maximum of the curved shape;
- means for determining target direction based upon sensor position and the maximum of the curved shape.

20. The apparatus of claim 19 wherein the convex curved sensor region approximates one of the following:
- a sphere;
- a cylinder;
- a dome;
- a cone;
- an ellipsoid;
- a polygon approximating a convex curve;
- a multi-sided face approximating a convex curve.

21. The apparatus of claim 20 wherein the sensors sense one of the following signals:
- infrared;
- sound;
- RF;
- ultraviolet.

* * * * *